US012596431B2

(12) United States Patent (10) Patent No.: US 12,596,431 B2
Ohba (45) Date of Patent: Apr. 7, 2026

(54) VIRTUAL REALITY CONTENT DISPLAY SYSTEM AND VIRTUAL REALITY CONTENT DISPLAY METHOD

(71) Applicant: Sony Interactive Entertainment Inc., Tokyo (JP)

(72) Inventor: Akio Ohba, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/863,365

(22) PCT Filed: Jun. 6, 2022

(86) PCT No.: PCT/JP2022/022808
§ 371 (c)(1),
(2) Date: Nov. 6, 2024

(87) PCT Pub. No.: WO2023/238197
PCT Pub. Date: Dec. 14, 2023

(65) Prior Publication Data
US 2025/0306674 A1 Oct. 2, 2025

(51) Int. Cl.
*G06F 3/01* (2006.01)
*G06F 3/16* (2006.01)
(Continued)

(52) U.S. Cl.
CPC .............. *G06F 3/012* (2013.01); *G06F 3/013* (2013.01); *G06F 3/167* (2013.01); *H04N 13/279* (2018.05);
(Continued)

(58) Field of Classification Search
CPC .......... G06F 3/012; G06F 3/013; G06F 3/167; H04N 13/279; H04N 13/327; H04N 13/344; H04N 13/366
See application file for complete search history.

(56) References Cited

U.S. PATENT DOCUMENTS 11,073,906 B1 * 7/2021 Hudman ................ G06N 3/045
2015/0312558 A1 * 10/2015 Miller .................. H04N 13/371
348/54
(Continued)

FOREIGN PATENT DOCUMENTS

CN 112083789 A * 12/2020 ............ G02C 11/10
JP H09-304729 A 11/1997
(Continued)

OTHER PUBLICATIONS

International Search Report and Written Opinion mailed on Aug. 23, 2022, received for PCT Application PCT/JP2022/022808, filed on Jun. 6, 2022, 11 pages including English Translation.

*Primary Examiner* — Douglas Wilson
(74) *Attorney, Agent, or Firm* — Kilpatrick Townsend & Stockton LLP

(57) ABSTRACT
A VR content display system includes a head-mounted display (HMD), a storage device, a position determination unit, and a display control unit. The position determination unit starts, in response to the HMD being taken out from the storage device, determination of whether positions of pupils of a user wearing the HMD are located at predetermined proper positions or not. The display control unit starts, in response to determination that the positions of the pupils of the user wearing the HMD are located at the proper positions, display of virtual reality content on the HMD.

18 Claims, 14 Drawing Sheets

STORAGE STAGE ⟹ MOUNTING AND REMOVAL STAGE ⟹ VIEWING STAGE

(51) Int. Cl.
  *H04N 13/279*        (2018.01)
  *H04N 13/327*        (2018.01)
  *H04N 13/344*        (2018.01)
  *H04N 13/366*        (2018.01)

(52) U.S. Cl.
  CPC ......... *H04N 13/327* (2018.05); *H04N 13/344*
              (2018.05); *H04N 13/366* (2018.05)

(56)                    References Cited

U.S. PATENT DOCUMENTS

| | | | | |
|---|---|---|---|---|
| 2020/0134867 A1* | 4/2020 | Zachrisson | ............... | G06T 7/74 |
| 2020/0326535 A1* | 10/2020 | Kim | ........................ | A63F 13/25 |
| 2022/0146828 A1* | 5/2022 | Ohba | .................... | G09G 5/003 |

FOREIGN PATENT DOCUMENTS

| | | | |
|---|---|---|---|
| JP | 2017-058794 A | 3/2017 |
| JP | 2021-511564 A | 5/2021 |
| JP | 2021-516132 A | 7/2021 |
| WO | 2015/108225 A1 | 7/2015 |
| WO | 2017/051564 A1 | 3/2017 |
| WO | 2020/170454 A1 | 8/2020 |
| WO | 2020/170455 A1 | 8/2020 |
| WO | 2020/170456 A1 | 8/2020 |

* cited by examiner

VR CONTENT DISPLAY SYSTEM 10

F I G . 3
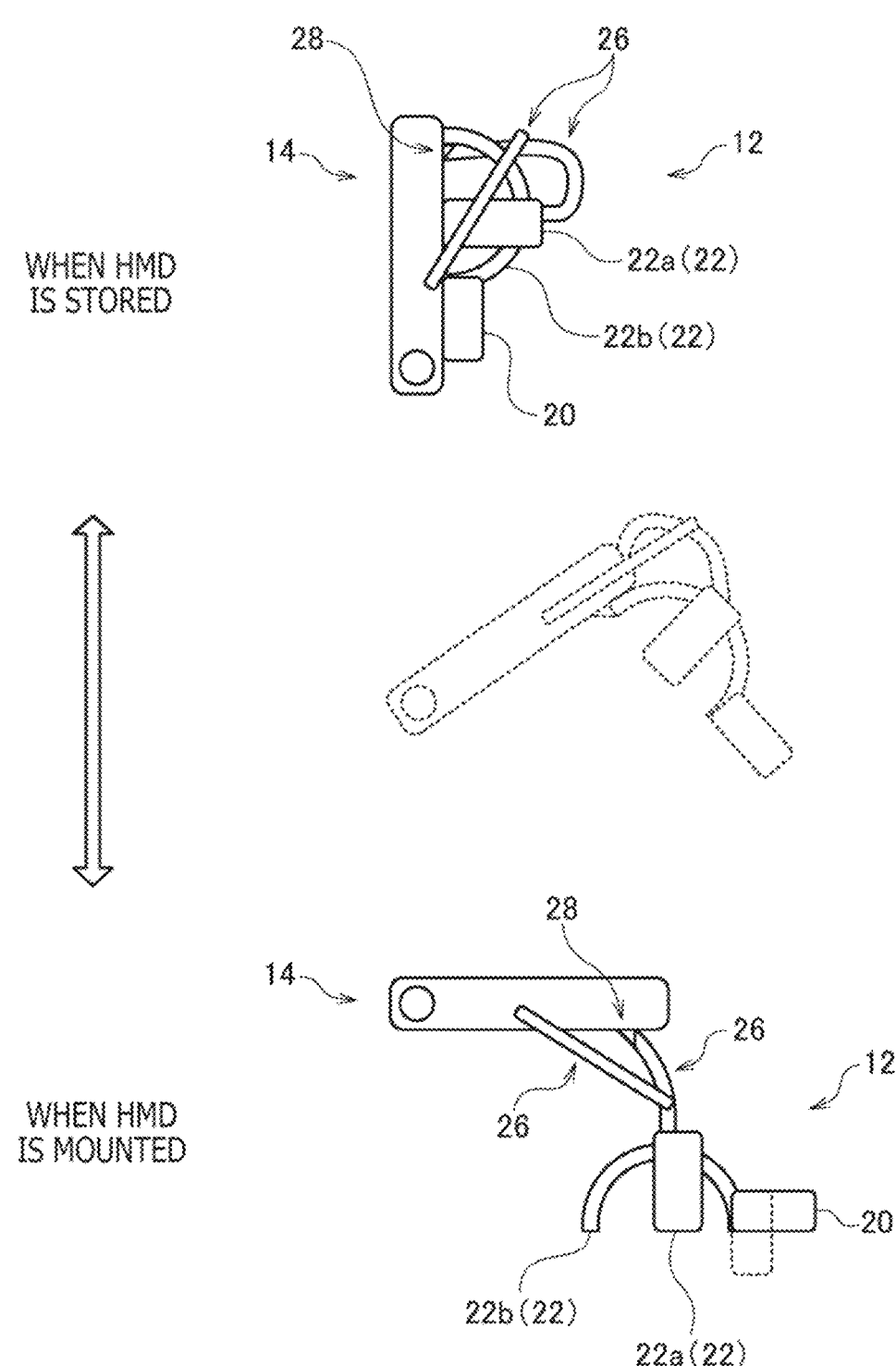
WHEN HMD
IS STORED
WHEN HMD
IS MOUNTED

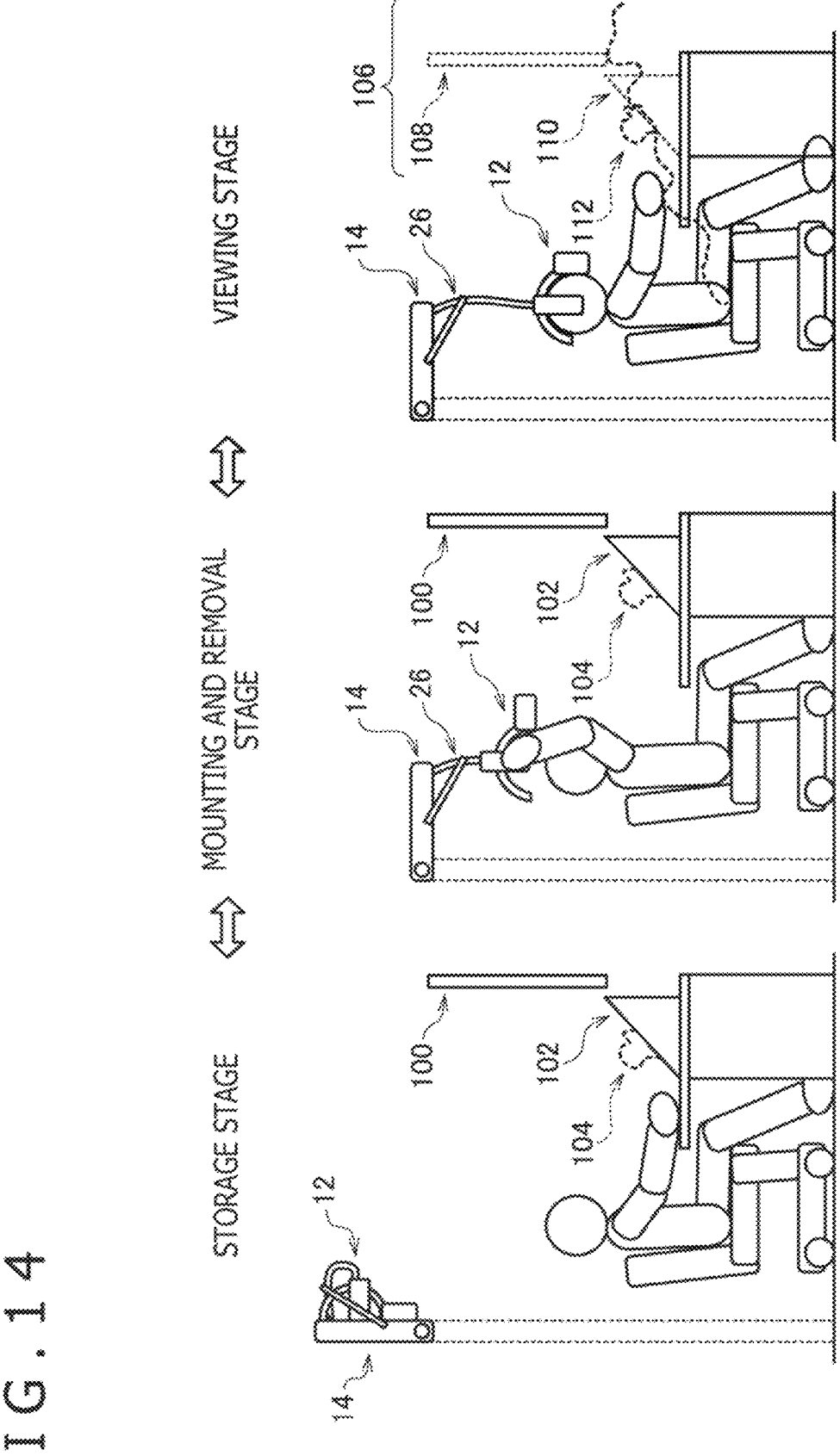
F I G . 1 4

VIRTUAL REALITY CONTENT DISPLAY SYSTEM AND VIRTUAL REALITY CONTENT DISPLAY METHOD

CROSS-REFERENCE TO RELATED APPLICATION

The present application is based on PCT filing PCT/JP2022/022808, filed Jun. 6, 2022, the entire contents of which are incorporated herein by reference.

TECHNICAL FIELD

The present invention relates to a data processing technology, in particular, to a virtual reality content display system and a virtual reality content display method.

BACKGROUND ART

Image display systems configured to allow a user wearing a head-mounted display to view a target space from a free viewpoint have become widespread. For example, there has been known electronic content for displaying a virtual three-dimensional space, for example, which displays images corresponding to a line of sight of a user on a head-mounted display, thereby achieving virtual reality (VR) (such electronic content will hereinafter be referred to also as "VR content"). Using head-mounted displays makes it possible to enhance the sense of immersion in a video and improve the operability of applications such as games. Further, there have also been developed walk-through systems configured to allow a user wearing a head-mounted display to virtually walk around in a space displayed as VR content when the user physically moves.

SUMMARY

Technical Problem

In a case where a user wears a head-mounted display taken out from a storage unit to view VR content, it is desirable that a length of time taken from mounting of the head-mounted display to display of the VR content be short.

The present invention has been made in view of such a problem, and it is an object thereof to provide a technology for promptly presenting VR content to a user wearing a head-mounted display taken out from a storage unit.

Solution to Problem

In order to solve the above-mentioned problem, a virtual reality content display system of a certain aspect of the present invention includes a head-mounted display including a first detection unit configured to detect positions of pupils of a user, a storage unit capable of storing the head-mounted display, a position determination unit configured to start, in response to the head-mounted display being taken out from the storage unit, determination of whether the positions of the pupils of the user wearing the head-mounted display detected by the first detection unit are located at predetermined proper positions or not, and a display control unit configured to start, in response to determination that the positions of the pupils of the user wearing the head-mounted display are located at the proper positions, display of virtual reality content on the head-mounted display.

Another aspect of the present invention is a virtual reality content display method. This method is executed by a computer and includes a step of starting, in response to a head-mounted display being taken out from a storage unit, the head-mounted display including a first detection unit configured to detect positions of pupils of a user, determination of whether the positions of the pupils of the user wearing the head-mounted display detected by the first detection unit are located at predetermined proper positions or not, and a step of starting, in response to determination that the positions of the pupils of the user wearing the head-mounted display are located at the proper positions, display of virtual reality content on the head-mounted display.

Note that any combination of the components described above as well as modes obtained by transforming the expressions of the present invention between devices, computer programs, recording media having recorded thereon a computer program in a readable manner, data structures, and the like are also effective as aspects of the present invention.

Advantageous Effect of Invention

According to the present invention, VR content can promptly be presented to a user wearing a head-mounted display taken out from a storage unit.

BRIEF DESCRIPTION OF DRAWINGS

FIG. 3 is a diagram illustrating other examples of the shapes of the HMD and the storage device of FIG. 1.

FIG. 14 is a diagram illustrating a configuration and a usage example of a VR content display system of a third embodiment.

DESCRIPTION OF EMBODIMENTS

First Embodiment

In a first embodiment, there is proposed a VR content display system configured to automate the mounting and removal of a head-mounted display (hereinafter referred to also as an "HMD") to the maximum extent, thereby shortening a length of time taken from taking out of the HMD from a storage device to display of VR content. The VR content may be, for example, an image indicating a virtual reality space selected or desired by a user. Further, the VR content may be an image with entertainment value (such as an image depicting a game world) or may be an image or data for business use (such as document data). However, it is assumed that the VR content in the embodiment does not include images for optical correction or testing. In the following, unless otherwise specified, images include either moving images or still images or include both of them.

The VR content display system of the first embodiment has (1) an HMD storage function, (2) an HMD automatic adjustment function, and (3) a support function. (1) The storage function includes a function of storing the HMD in a compact shape. Further, the storage function includes a function of automatically mounting the HMD on the user and a function of automatically removing the HMD from the user and storing the HMD. The storage function is achieved by the storage device and the HMD.

(2) The automatic adjustment function includes optical correction for HMD mounting and line-of-sight-dependent rendering correction for VR content display. The automatic adjustment function is achieved by the HMD. (3) The support function includes a function of supporting and assisting in restricting user movement and reducing user load. The support function is achieved by a member (in the embodiment, a support unit 26 described later) configured to connect the storage device to the HMD.

Figure 1:
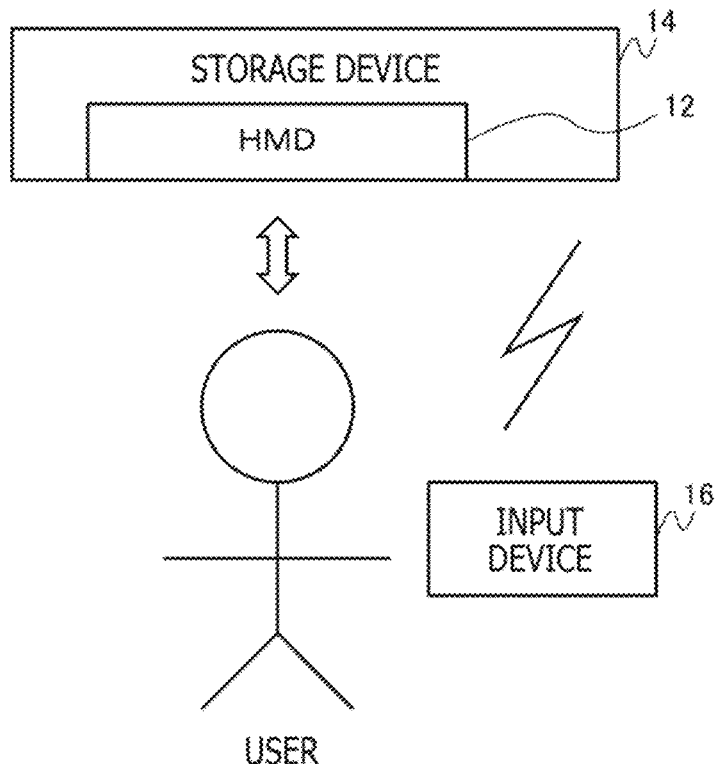
FIG. 1 is a diagram illustrating a configuration of a VR content display system of a first embodiment.

FIG. 1 illustrates a configuration of a VR content display system 10 of the first embodiment. The VR content display system 10 includes an HMD 12, a storage device 14, and an input device 16. The input device 16 is a device for the user to input instructions (operations) for the HMD 12 and the storage device 14. The input device 16 may be achieved by a keyboard, a gamepad, a touch panel, or the like. The input device 16 transmits data related to the input user operations to the HMD 12 and the storage device 14 via wireless communication.

Figure 2:
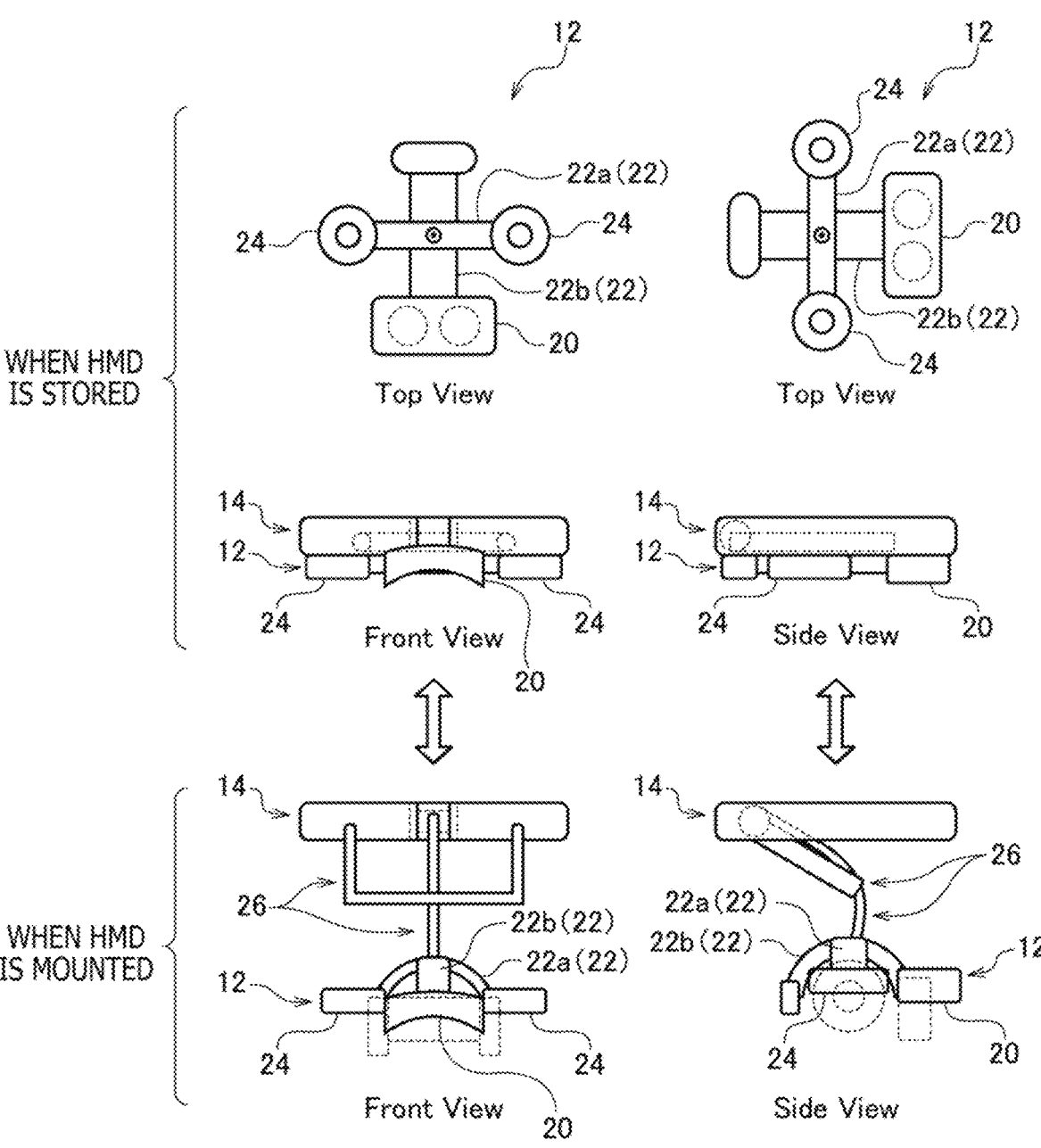
FIG. 2 is a diagram illustrating examples of shapes of an HMD and a storage device of FIG. 1.

FIG. 2 illustrates examples of shapes of the HMD 12 and the storage device 14 of FIG. 1. An upper part of FIG. 2 includes a top view illustrating the HMD 12 when stored, and front and side views illustrating the HMD 12 and the storage device 14 when the HMD 12 is stored. The storage device 14 can also be called a "storage unit capable of storing the HMD 12." The HMD 12 includes an output mechanism unit 20, a mounting mechanism unit 22, and speakers 24.

The output mechanism unit 20 includes a housing shaped to cover the left and right eyes of the user when the HMD 12 is mounted. The output mechanism unit 20 includes, inside the housing, display panels (left-eye display panel and right-eye display panel) disposed to directly face the left and right eyes of the user when the HMD 12 is mounted. It is assumed that the display panels of the HMD 12 of the embodiment do not have optical transparency, that is, the HMD 12 of the embodiment is a non-see-through HMD. The speakers 24 are provided at positions corresponding to the ears of the user when the HMD 12 is mounted.

The mounting mechanism unit 22 is a mechanism configured to achieve the mounting and fixing of the HMD 12 on the head of the user. The mounting mechanism unit 22 includes a mounting mechanism unit 22a and another mounting mechanism unit 22b. The mounting mechanism unit 22a is a member configured to cover the head of the user in a left-right direction (a direction perpendicular to the orientation of the user). The mounting mechanism unit 22b is a member configured to cover the head of the user in a front-back direction (a direction horizontal to the orientation of the user).

A lower part of FIG. 2 includes front and side views illustrating the HMD 12 and the storage device 14 when the HMD 12 is mounted. The HMD 12 is connected to the storage device 14 through the support unit 26. The support unit 26 includes (1) a cable configured to hold the HMD and transmit force for restricting the movement of the user, (2) a cable winding mechanism, and (3) a servo mechanism configured to control tension on the cable to be constant. Note that the support unit 26 of the embodiment includes a communication cable through which signals that are exchanged between the HMD 12 and the storage device 14 flow. In the embodiment, it is assumed that the HMD 12 performs wired communication with the storage device 14, but as a modified example, the HMD 12 may perform wireless communication with the storage device 14.

FIG. 3 illustrates other examples of the shapes of the HMD 12 and the storage device 14 of FIG. 1. FIG. 3 illustrates shapes simpler than the shapes of FIG. 2. The storage device 14 further includes a storage hook 28. When the HMD 12 is stored, the storage hook 28 supports and fixes the HMD 12 to maintain the stored state of the HMD 12. When the HMD 12 is mounted, the storage hook 28 is released to release the HMD 12 from the storage device 14.

Figure 4:
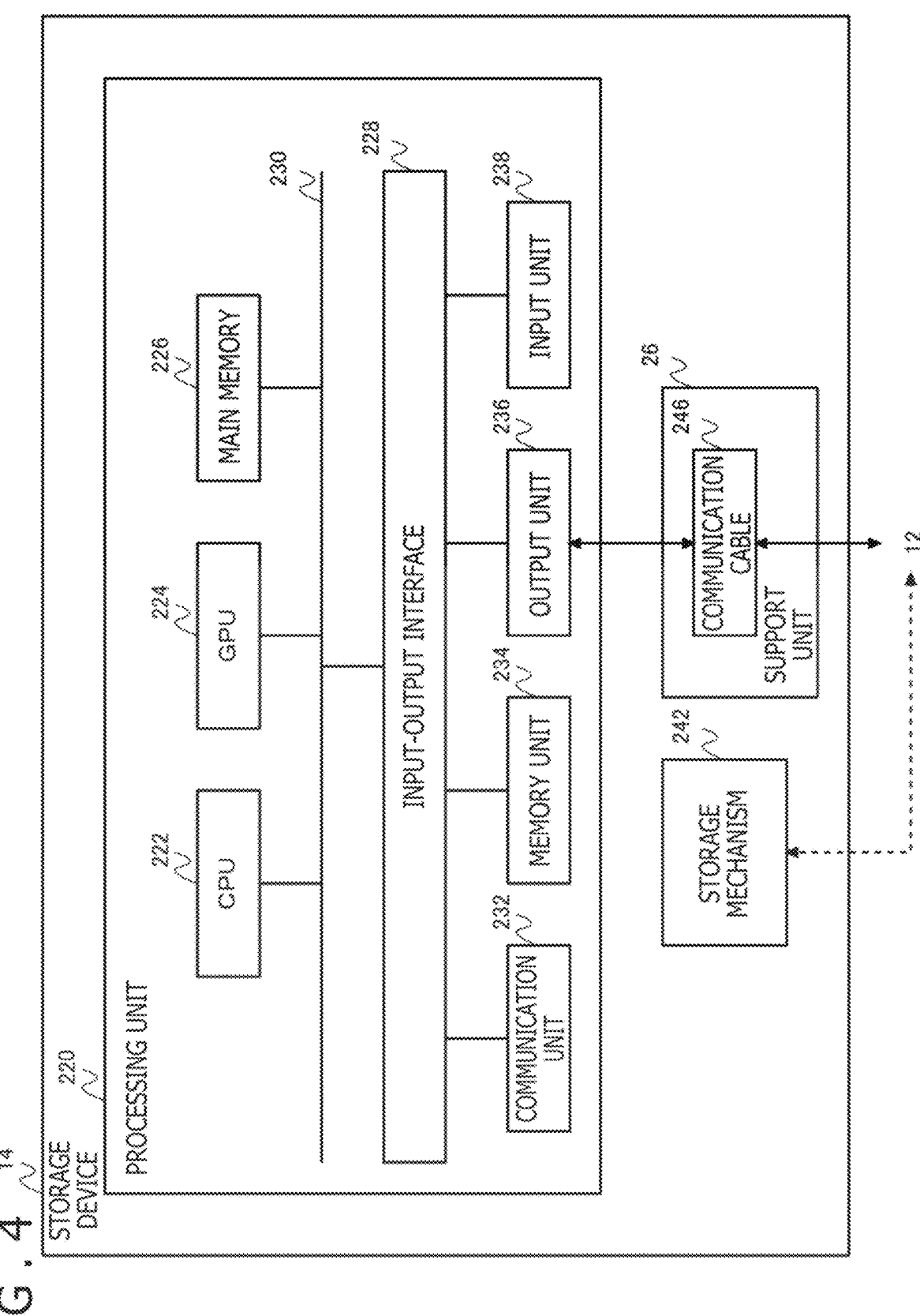
FIG. 4 is a diagram illustrating an example of a hardware configuration of the storage device of FIG. 1.

FIG. 4 illustrates an example of a hardware configuration of the storage device 14 of FIG. 1. The storage device 14 includes a processing unit 220, a storage mechanism 242, and the support unit 26. The support unit 26 includes a communication cable 246 that is connected to the HMD 12. However, the support unit 26 is a member whose primary purpose is to hold the HMD 12 and transmit force for restricting the movement of the user. The storage mechanism 242 is a member for storing the HMD 12. The storage mechanism 242 may include members configured to support or fix the HMD 12 (for example, storage hooks).

The processing unit 220 includes a computer configured to execute various types of data processing including rendering of VR content. The processing unit 220 includes a central processing unit (CPU) 222, a graphics processing unit (GPU) 224, and a main memory 226. These units are connected to one another via a bus 230. An input-output interface 228 is further connected to the bus 230. The input-output interface 228 is connected to a communication unit 232, a memory unit 234, an output unit 236, and an input unit 238.

The communication unit 232 includes a peripheral interface such as a USB or IEEE 1394 interface, and a network interface such as a wired LAN or a wireless LAN. The processing unit 220 sends or receives data to or from an external device (for example, a content distribution server on a cloud) via the communication unit 232. The memory unit 234 includes a hard disk drive, a non-volatile memory, or the like. The output unit 236 outputs data to the HMD 12. The input unit 238 receives input data from the HMD 12 and receives input data (such as information regarding user operations) from the input device 16.

The CPU 222 executes an operating system stored in the memory unit 234 to control the entirety of the storage device 14. Further, the CPU 222 executes various programs (for example, VR game applications) that are read from the memory unit 234 or a removable recording medium to be loaded into the main memory 226, or that are downloaded via the communication unit 232. The GPU 224 has a function of a geometry engine and a function of a rendering processor. The GPU 224 performs rendering processing in accordance with rendering commands from the CPU 222 and outputs the rendering results to the output unit 236. The main memory 226 includes a random access memory (RAM) and stores programs and data necessary for processing.

Figure 5:
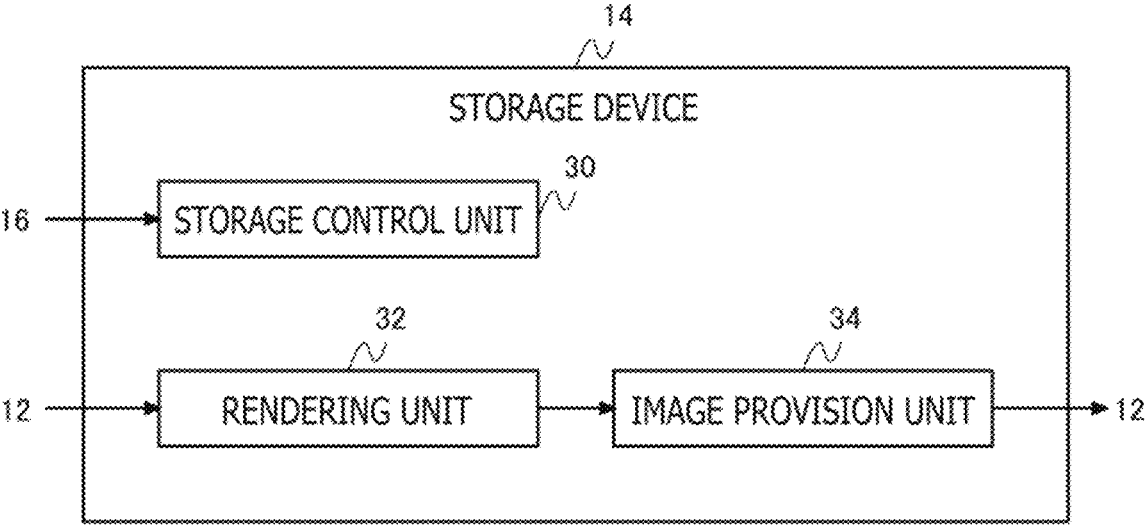
FIG. 5 is a block diagram illustrating functional blocks included in the storage device of FIG. 1.

FIG. 5 is a block diagram illustrating functional blocks included in the storage device 14 of FIG. 1. The plurality of functional blocks illustrated in the block diagram of this specification can be achieved by combinations of various electronic circuits (for example, the configurations illustrated in FIG. 4, such as the CPU 222, the GPU 224, the main memory 226, and the memory unit 234) in terms of hardware. Further, in terms of software, the functional blocks can be achieved by a computer program including a plurality of program modules corresponding to the plurality of functional blocks. Thus, it is to be understood by those skilled in the art that these functional blocks can be achieved in various forms by hardware only, software only, or a combination thereof and are not limited to any of them.

The storage device 14 includes a storage control unit 30, a rendering unit 32, and an image provision unit 34. A computer program in which the functions of these functional blocks are implemented may be installed in the memory unit 234. The CPU 222 and the GPU 224 may read this computer program into the main memory 226 and execute the computer program, to thereby exhibit the functions of the plurality of functional blocks illustrated in FIG. 5.

The storage control unit 30 controls the operation of the support unit 26 to release the HMD 12 from the state of being stored and fixed in the storage device 14, and thereby causes a transition to the state in which the HMD 12 can be mounted on the head of the user. Further, the storage control unit 30 controls the operation of the support unit 26 to store and fix the HMD 12 removed from the head of the user in the storage device 14.

Figure 6:
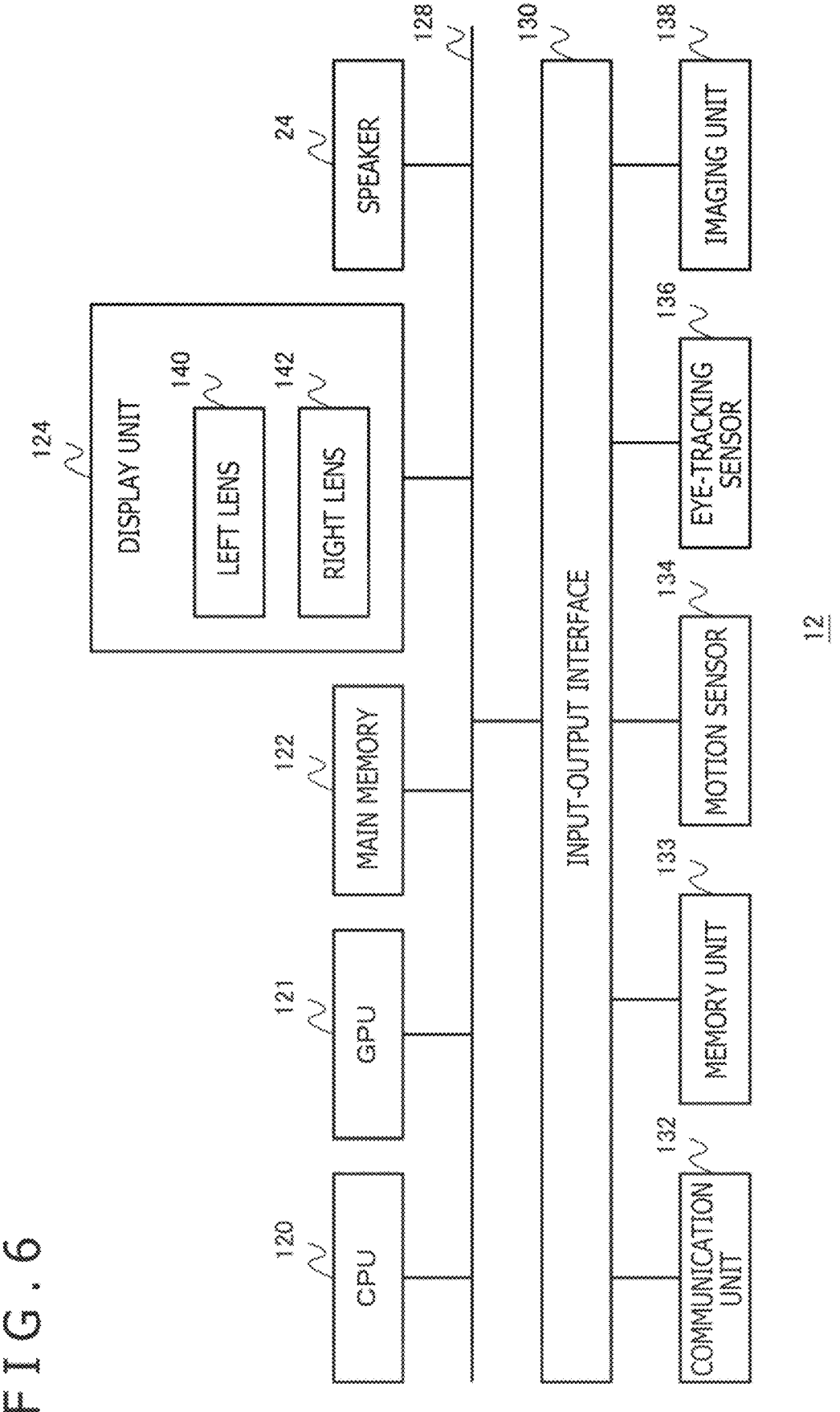
FIG. 6 is a diagram illustrating an example of a hardware configuration of the HMD of FIG. 1.

FIG. 6 illustrates an example of a hardware configuration of the HMD 12 of FIG. 1. The HMD 12 includes a CPU 120, a GPU 121, a main memory 122, a display unit 124, and the speakers 24. These units are connected to one another via a bus 128. An input-output interface 130 is further connected to the bus 128. The input-output interface 130 is connected to a communication unit 132, a memory unit 133, a motion sensor 134, an eye-tracking sensor 136, and an imaging unit 138.

The CPU 120 processes information acquired from each unit of the HMD 12 via the bus 128 and supplies the display unit 124 and the speakers 24 with data regarding display images and audio acquired from the storage device 14. The GPU 121 has a function of a geometry engine and a function of a rendering processor. The GPU 121 performs rendering processing in accordance with rendering commands from the CPU 120 and outputs the rendering results to the display unit 124. The main memory 122 stores programs and data necessary for processing in the CPU 120 and the GPU 121.

The display unit 124 includes display panels such as liquid crystal panels or organic EL panels and displays images in front of the eyes of the user wearing the HMD 12. The display unit 124 displays a pair of stereo images on the left-eye display panel provided in front of the left eye of the user and on the right-eye display panel provided in front of the right eye of the user, and thereby achieves stereoscopic vision.

The display unit 124 further includes a pair of eyepiece lenses positioned between the display panels and the eyes of the user when the HMD 12 is mounted, the eyepiece lenses being configured to expand the viewing angle of the user. The pair of eyepiece lenses includes a left lens 140 and a right lens 142. The left lens 140 is provided between the left-eye display panel and the left eye of the user, and the right lens 142 is provided between the right-eye display panel and the right eye of the user.

The speakers 24 are provided at positions corresponding to the ears of the user when the HMD 12 is mounted. The speakers 24 may include earphones. The communication unit 132 is an interface for sending and receiving data to and from the storage device 14 and the input device 16. The communication unit 132 achieves communication using known communication technologies such as a wired LAN, a wireless LAN, or Bluetooth (registered trademark). The memory unit 133 includes a non-volatile memory or the like. The motion sensor 134 includes a gyro sensor and an acceleration sensor and acquires an angular velocity and acceleration of the HMD 12.

The eye-tracking sensor 136 is a sensor serving as a first detection unit and includes a well-known sensor for eye-tracking (including an infrared camera or the like). Eye-tracking, which can also be called "line-of-sight measurement," is a technology for detecting positions, movement, and lines of sight of the pupils (also called "eyeballs") of the user. For example, the eye-tracking sensor 136 detects the positions and movement of the pupils of the user on the basis of reflection patterns of infrared light or the like. The imaging unit 138 includes a camera configured to image the head of the user. The direction in which the imaging unit 138 takes images at least includes a direction from the storage position of the HMD 12 in the storage device 14 to the head of the user.

Figure 7:
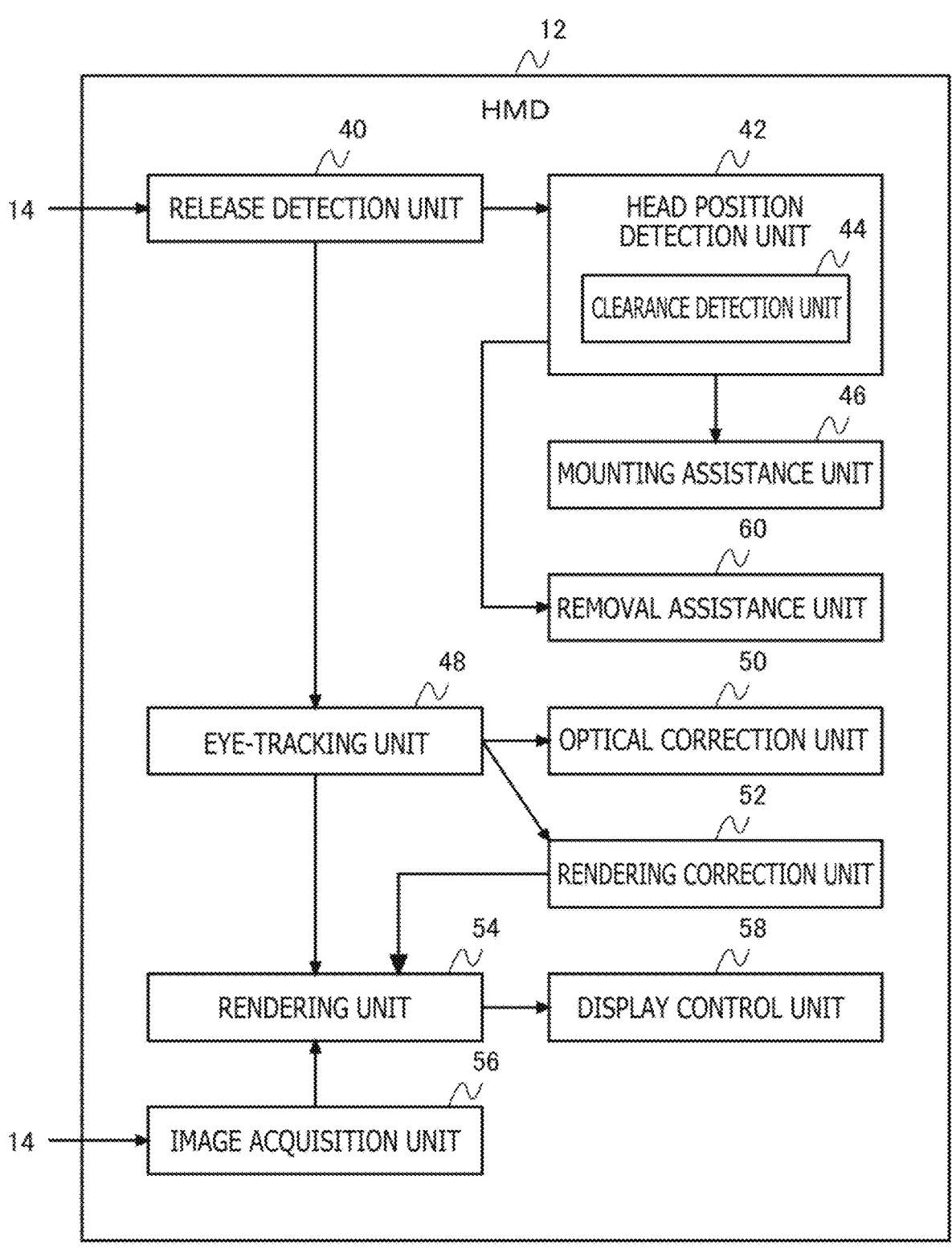
FIG. 7 is a block diagram illustrating functional blocks included in the HMD of FIG. 1.

FIG. 7 is a block diagram illustrating functional blocks included in the HMD 12 of FIG. 1. The HMD 12 includes a release detection unit 40, a head position detection unit 42, a mounting assistance unit 46, an eye-tracking unit 48, an optical correction unit 50, a rendering correction unit 52, a rendering unit 54, an image acquisition unit 56, a display control unit 58, and a removal assistance unit 60. The head position detection unit 42 includes a clearance detection unit 44. A computer program in which the functions of these functional blocks are implemented may be installed in the memory unit 133. The CPU 120 and the GPU 121 may read this computer program into the main memory 226 and execute the computer program, to thereby exhibit the functions of the plurality of functional blocks illustrated in FIG. 7.

Figure 8:
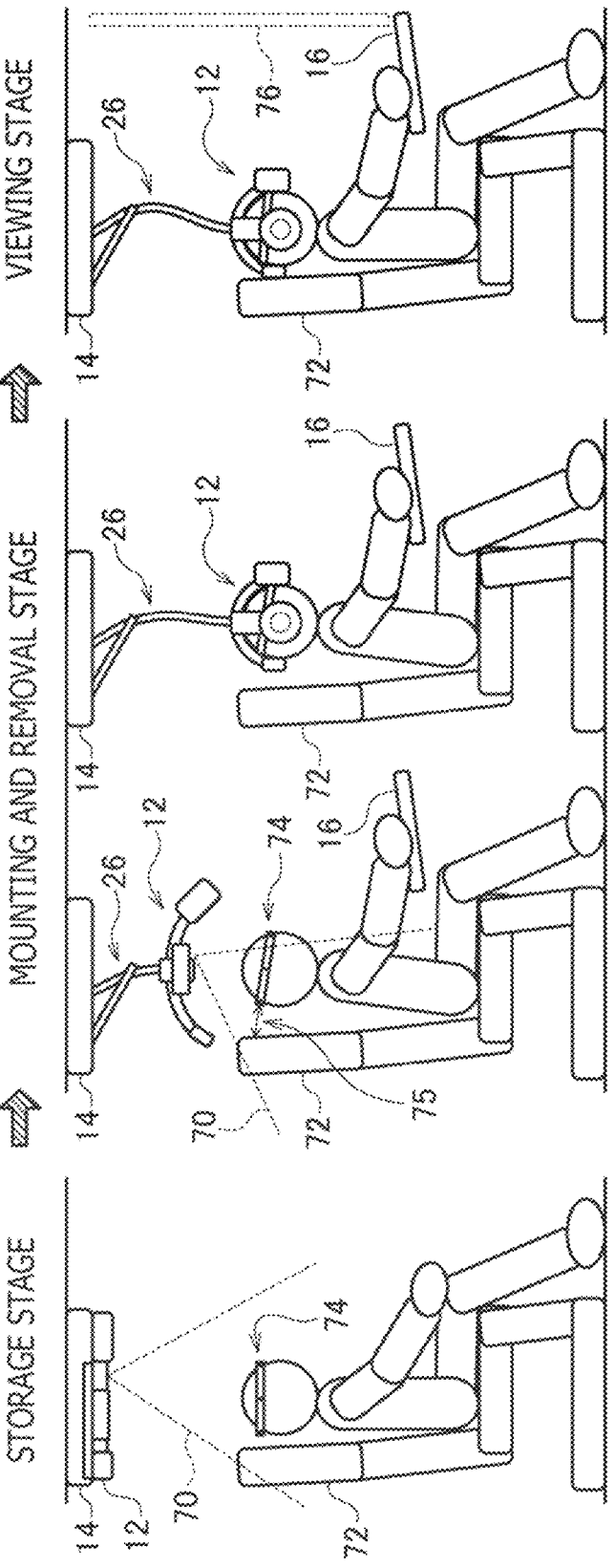
FIG. 8 is a diagram schematically illustrating an operation performed from the time when the HMD is taken out from the storage device to the time when VR content is displayed on the HMD in the VR content display system of the first embodiment.

An operation of the VR content display system 10 having the configuration described above is described. FIG. 8 schematically illustrates an operation performed from the time when the HMD 12 is taken out from the storage device 14 to the time when VR content is displayed on the HMD 12 in the VR content display system 10 of the first embodiment. The VR content display system 10 transitions through a storage stage, a mounting and removal stage, and a viewing stage in that order before displaying VR content.

The storage stage is a state in which the HMD 12 is stored in the storage device 14, in other words, a state in which the HMD 12 is not in use. The viewing stage is a state in which the HMD 12 is completely mounted on the head of the user and VR content is displayed on the HMD 12. The mounting and removal stage is a state between the storage stage and the viewing stage and includes both a mounting transition stage and a storage transition stage. The mounting transition stage is a state between the taking out of the HMD 12 from the storage device 14 and the completion of mounting of the HMD 12 on the head of the user, as illustrated in FIG. 8. The storage transition stage is a state between the removal of the HMD 12 from the head of the user and the completion of storage of the HMD 12 in the storage device 14, in contrast to that in FIG. 8.

A user who is about to view VR content wears a marker band 74 on his/her head and sits on a seat 72. The marker band 74 includes a marker (for example, a magnetic marker) whose position is detected by a sensor (for example, a magnetic sensor) on the HMD 12 side. The marker band 74 may take the form of eyeglasses, a hairband, or a headband, or other shapes. An imaging range 70 indicates an imaging range (that is, angle of view) of the imaging unit 138 of the HMD 12.

The user inputs an operation indicating a viewing request for the VR content to the input device 16. The viewing request includes a request to mount the HMD 12 and can also be called a "mounting request for the HMD 12." The input device 16 receives the viewing request from the user and transmits that viewing request to the storage device 14. The VR content display system 10 transitions from the storage stage to the mounting and removal stage (viewing transition stage) in response to the reception of the viewing request from the user. The storage control unit 30 of the storage device 14 releases the HMD 12 from the storage device 14 in response to the viewing request transmitted from the input device 16. For example, the storage control unit 30 releases the stored state of the HMD 12 by operating the support unit 26 to extend the cable, and moves the HMD 12 downward to move the HMD 12 toward the head of the user.

The release detection unit 40 of the HMD 12 detects that the HMD 12 has been taken out from the storage device 14, in other words, that the stored state of the HMD 12 has been released. The release detection unit 40 notifies the head position detection unit 42 and the eye-tracking unit 48 that the HMD 12 has been taken out from the storage device 14. The fact that the HMD 12 has been taken out from the storage device 14 may be detected mechanically or electrically, or may be detected using well-known methods. As a modified example, the HMD 12 may include a viewing request detection unit configured to detect a viewing request transmitted from the HMD 12, instead of the release detection unit 40. In this case, the subsequent processing of the HMD 12 may be executed in response to the detection of the viewing request, instead of being executed in response to the release of the HMD 12 from the storage device 14.

The imaging unit 138 of the HMD 12 starts the processing of imaging the head of the user in response to the HMD 12 being taken out from the storage device 14, in other words, in response to the transition from the storage stage to the mounting and removal stage. The head position detection unit 42 of the HMD 12, which serves as a second detection unit, detects the position of the head of the user on the basis of images captured by the imaging unit 138. For example, the head position detection unit 42 detects the relative position of the head of the user with respect to the HMD 12. Further, the HMD 12 includes a marker sensor (for example, a magnetic sensor) capable of detecting the marker of the marker band 74. The head position detection unit 42 detects the marker position of the marker band 74 mounted on the head of the user on the basis of signals output from the marker sensor and detects the position of the head of the user and the mounting position of the HMD 12 by use of the marker position as a reference.

The clearance detection unit 44 of the head position detection unit 42 detects a clearance around the head of the user on the basis of the images captured by the imaging unit 138. In the example of FIG. 8, the clearance detection unit 44 detects a gap (distance) between the seat 72 and the head of the user as a clearance 75. As a modified example, the clearance detection unit 44 may detect a gap between a seat in front of the seat 72 and the head of the user as a clearance around the head of the user. Further, the clearance detection unit 44 may detect a gap between the head of the user and the head of a person seated next to the user as a clearance around the head of the user.

The mounting assistance unit 46 of the HMD 12 automatically mounts the HMD 12 on the head of the user on the basis of the position of the head of the user and the mounting position of the HMD 12 which are detected by the head position detection unit 42. In the first embodiment, the mounting assistance unit 46 automatically mounts the HMD 12 on the head of the user in a case where the clearance around the head of the user detected by the clearance detection unit 44 is equal to or greater than a predetermined threshold. This threshold is a value of a clearance to be secured to safely mount the HMD 12 on the head of the user in a mode suitable for viewing VR content. As this threshold, an appropriate value may be set on the basis of knowledge of developers or experiments using the VR content display system 10, for example.

The mounting assistance unit 46 transmits, to the storage device 14, a signal instructing a change in the position of the HMD 12, on the basis of the relative position of the head of the user with respect to the HMD 12. The above-mentioned signal may be, for example, a signal instructing extension of the cable of the support unit 26. The storage control unit 30 of the storage device 14 changes the position of the HMD 12 on the basis of the above-mentioned signal transmitted from the HMD 12. In the example of FIG. 8, the storage control unit 30 may extend the cable of the support unit 26, and thereby move the HMD 12 downward. Further, the mounting assistance unit 46 deforms the mounting mechanism unit 22*a* and the mounting mechanism unit 22*b* to mount the HMD 12 at the mounting position detected on the basis of the marker on the head of the user, and thereby fixes the HMD 12 at a proper position on the head of the user.

The eye-tracking sensor 136 of the HMD 12 starts the processing of detecting the positions of the pupils of the user in response to the HMD 12 being taken out from the storage device 14, in other words, in response to the transition from the storage stage to the mounting and removal stage. The eye-tracking unit 48 functions as a position determination unit and starts determination of whether the positions of the pupils of the user wearing the HMD 12 are located at predetermined proper positions or not, in response to the HMD 12 being taken out from the storage device 14. The eye-tracking unit 48 repeatedly executes the above-mentioned determination during the mounting and removal stage until the above-mentioned determination provides a positive result.

The positions of the pupils of the user being located at the predetermined proper positions may mean that the relative positions of the pupils of the user with respect to the lenses of the HMD 12 are within a predetermined proper range. Further, the positions of the pupils of the user being located at the predetermined proper positions may also mean that both of the following conditions (1) and (2) are satisfied.

(1) The left pupil of the user is positioned to directly face the left lens 140, or a deviation width between the center of the left pupil of the user and the center of the left lens 140 is within a predetermined threshold.

(2) The right pupil of the user is positioned to directly face the right lens 142, or a deviation width between the center of the right pupil of the user and the center of the right lens 142 is within a predetermined threshold. As the proper positions and thresholds described above, appropriate conditions and values may be set from the knowledge of the developers or experiments using the VR content display system 10, for example.

During the mounting and removal stage, in other words, during a period until the eye-tracking unit 48 determines that the positions of the pupils of the user are located at the predetermined proper positions, the optical correction unit 50 continues to execute optical correction for the mounting of the HMD 12 for bringing the positions of the pupils of the user into the predetermined proper positions. The optical correction for the mounting of the HMD 12 can also be called "optical position correction" and includes, for example, viewpoint position adjustment, interpupillary distance adjustment, and diopter adjustment. The diopter adjustment is processing of adjusting lens power of the HMD depending on eyesight of the user. The optical correction unit 50 may adjust the respective positions of the left lens 140 and the right lens 142 (positions in the front-back direction, an up-down direction, and the left-right direction, as well as a distance between the lenses) in an interactive manner with the user during the optical correction for the mounting of the HMD 12.

In a case where the eye-tracking unit 48 determines that the positions of the pupils of the user are within the predetermined proper range, the VR content display system 10 transitions from the mounting and removal stage (viewing transition stage) to the viewing stage. The display control unit 58 of the HMD 12 causes the display of the VR content on the HMD 12 to be started in response to the transition from the mounting and removal stage to the viewing stage, in other words, in response to the determination made by the eye-tracking unit 48 that the positions of the pupils of the user are within the predetermined proper range. The display control unit 58 causes the display unit 124 (left and right display panels) of the HMD 12 to display at least one of VR content data generated by the rendering unit 32 of the storage device 14 and VR content data generated by the rendering unit 54 of the HMD 12. The VR content may depict various VR objects on a large virtual screen 76 disposed at a predetermined distance from the user, for example.

Specifically, the image acquisition unit 56 of the HMD 12 transmits a signal instructing start of the generation of VR content data to the storage device 14, in response to the transition from the mounting and removal stage to the viewing stage. The rendering unit 32 of the storage device 14 starts the generation of VR content data in response to reception of the above-mentioned signal from the HMD 12. The rendering unit 32 generates VR content data on the basis of at least one of data input from the input device 16, data transmitted from an external device (such as a server), and data stored in the memory unit 234 (such as programs or parameters related to VR content).

The VR content data generated by the rendering unit 32 of the storage device 14 may include pre-corrected VR images including various VR objects. Further, the VR content data may include VR images representing distant views from a viewpoint of the user in the VR space. The image provision unit 34 of the storage device 14 transmits the VR content data generated by the rendering unit 32 to the HMD 12. The image acquisition unit 56 of the HMD 12 acquires the VR content data transmitted from the storage device 14.

The rendering unit 54 of the HMD 12 starts the generation of VR content data in response to the transition from the mounting and removal stage to the viewing stage. The rendering unit 54 generates VR content data on the basis of at least one of VR content data transmitted from the storage device 14, data input from the input device 16, data stored in the memory unit 133 (such as programs or parameters related to VR content), and the viewpoint and line of sight of the user detected by the eye-tracking unit 48.

The rendering unit 54 may execute well-known reprojection processing (referred to also as "asynchronous timewarp processing") in response to the movement of the HMD 12 detected by the motion sensor 134. In this case, the rendering unit 54 may process basic VR images transmitted from the storage device 14, in response to changes in the line of sight of the user, and thereby generate VR images for display as VR content data.

Further, the rendering unit 54 may generate VR images representing near views from the viewpoint of the user in the VR space. In this case, the rendering unit 54 may generate, as a VR image for display as VR content data, a composite image by combining a VR image (distant view image) transmitted from the storage device 14 and a VR image (near view image) generated by the rendering unit 54. In any case, the display control unit 58 of the HMD 12 may cause the display unit 124 to display the VR images for display generated by the rendering unit 54.

The rendering correction unit 52 of the HMD 12 executes line-of-sight-dependent rendering correction for VR content display in response to the transition from the mounting and removal stage to the viewing stage. The line-of-sight-dependent rendering correction includes rendering position correction depending on the line of sight of the user and foveal precision correction (for example, chromatic aberration correction or lens distortion correction). Note that, regarding the line-of-sight-dependent rendering correction, the technologies described in Documents 1 to 3 listed below may be applied.

Document 1: PCT Patent Publication No. WO2020/170454

Document 2: PCT Patent Publication No. WO2020/170455

Document 3: PCT Patent Publication No. WO2020/170456

The rendering unit 54 may generate VR images for display such that VR objects are rendered at rendering positions corrected by the rendering correction unit 52.

With the VR content display system 10 of the first embodiment, since the HMD 12 can be stored in the storage device 14, it is possible to avoid the HMD 12 becoming an obstacle when no VR content is being viewed. Further, in the VR content display system 10 of the first embodiment, the determination of whether the positions of the pupils of the user are located at the proper positions or not starts in response to the HMD 12 being taken out from the storage device 14, and the display of VR content starts in response to the determination providing a positive result. With this, the length of time taken from mounting of the HMD 12 on the head of the user to display of VR content on the HMD 12 can be shortened, thereby providing the VR content to the user promptly.

Further, with the VR content display system 10 of the first embodiment, the HMD 12 is automatically mounted on the head of the user, leading to a reduction in workload on the user to view VR content. Further, automatically mounting the HMD 12 under the condition that there is a sufficient clearance around the head of the user makes it possible to prevent a failure in the automatic mounting of the HMD 12 and enhance the safety thereof.

Figure 9:
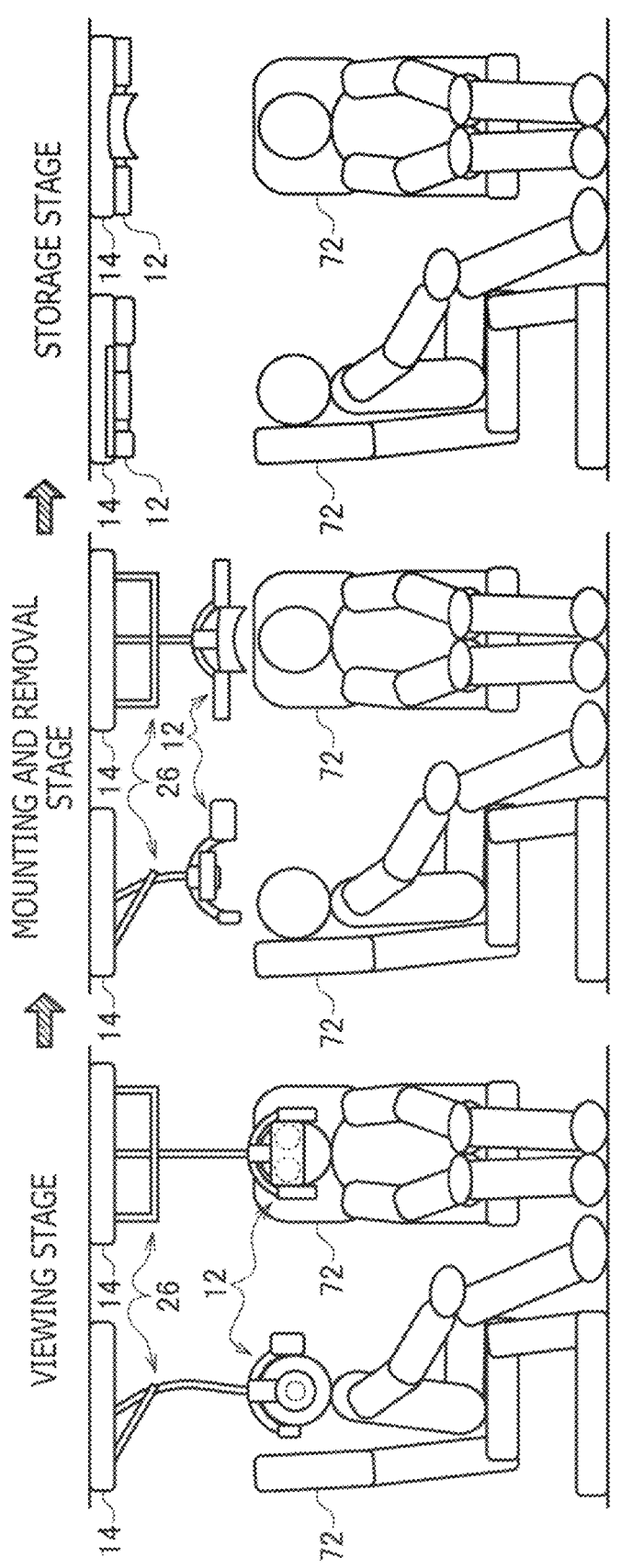
FIG. 9 is a diagram schematically illustrating an operation performed from the time when the display of VR content on the HMD ends to the time when the HMD is stored into the storage device in the VR content display system of the first embodiment.

FIG. 9 schematically illustrates an operation performed from the time when the display of VR content on the HMD 12 ends to the time when the HMD 12 is stored into the storage device 14 in the VR content display system 10 of the first embodiment. The VR content display system 10 transitions through the viewing stage, the mounting and removal stage (storage transition stage), and the storage stage in that order before storing the HMD 12 into the storage device 14.

The VR content display system 10 transitions from the viewing stage to the mounting and removal stage (storage transition stage) in a case where predetermined removal conditions are satisfied on the viewing stage. Specifically, the removal assistance unit 60 of the HMD 12 automatically removes the HMD 12 from the head of the user in a case where any of a plurality of removal conditions defined in advance is satisfied during the display of VR content.

For example, the removal assistance unit 60 deforms the mounting mechanism unit 22a and the mounting mechanism unit 22b, and thereby releases the state in which the HMD 12 is fixed to the head of the user. Further, the removal assistance unit 60 transmits a signal instructing a change in the position of the HMD 12, for example, a signal instructing winding up of the cable of the support unit 26, to the storage device 14. The storage control unit 30 of the storage device 14 winds up the cable of the support unit 26 by a first amount defined in advance, on the basis of the above-mentioned signal transmitted from the HMD 12, and thereby causes a transition to a state in which the HMD 12 is suspended above the user (hereinafter referred to also as a "standby state") as illustrated in the mounting and removal stage of FIG. 9.

The plurality of removal conditions include the following conditions (1) to (4).

(1) A predetermined user operation (for example, an operation instructing an end of viewing) is input for VR content.

(2) The position and/or angle of the head of the user (in other words, the position and/or angle of the HMD 12) detected by the motion sensor 134 deviates from a proper range defined in advance. The proper range is a range of positions and angles suitable for viewing VR content, and appropriate values may be defined on the basis of restrictions in an environment surrounding the user (for example, a range of positions and angles that prevents an interference with people next to the user).

(3) A predetermined voice command (for example, voice of "end viewing") is input to the HMD 12 directly or via the input device 16.

(4) A predetermined user operation (for example, a touch operation instructing an end of viewing) is input to the HMD 12 or the input device 16.

The removal assistance unit 60 waits until a storage instruction operation is input from the user in a case where the HMD 12 enters the standby state. The period of waiting for the input of a storage instruction operation is a period in which a re-mounting instruction operation may be input from the user. In a case where it is notified by the input device 16 that a re-mounting instruction operation has been input from the user, the mounting assistance unit 46 of the HMD 12 executes the already-described automatic mounting sequence again.

In a case where it is notified by the input device 16 that a storage instruction operation has been input from the user, the removal assistance unit 60 stores the HMD 12 in the standby state into the storage device 14 in cooperation with the storage control unit 30 of the storage device 14. For example, the removal assistance unit 60 may transmit a signal instructing winding up of the cable of the support unit 26 to the storage device 14. The storage control unit 30 of the storage device 14 may wind up the cable of the support unit 26 by a second amount defined in advance, on the basis of the above-mentioned signal transmitted from the HMD 12, and thereby cause a transition to a state in which the HMD 12 is stored in the storage device 14.

Note that the imaging unit 138 of the HMD 12 may image not only the user's head side but also the space around the HMD 12. The removal assistance unit 60 may automatically store, in a case where an object (an object other than the head of the user) approaching the HMD 12 in the standby state is detected, the HMD 12 in the standby state into the storage device 14 in cooperation with the storage control unit 30 of the storage device 14, even when a storage instruction operation has not been input from the user. This makes it easier to avoid the HMD 12 colliding with other objects or becoming an obstacle.

In the VR content display system 10 of the first embodiment, the HMD 12 is automatically stored into the storage device 14 when the viewing of VR content ends.

With this, work of the user at the end of viewing VR content can be reduced, thereby enhancing convenience of the VR content display system 10.

A modified example is described. The VR content display system 10 of the first embodiment automatically transitions from the storage stage to the viewing stage. As a modified example, the VR content display system 10 may be configured to semi-automatically (in other words, partially manually) transition from the storage stage to the viewing stage. The storage device 14 of the modified example includes functional blocks similar to those of the storage device 14 of the first embodiment. The HMD 12 of the modified example does not include the mounting assistance unit 46 unlike the HMD 12 of the first embodiment, but is similar to the HMD 12 of the first embodiment in terms of other functional blocks. This is because, in this modified example, the user manually wears the HMD 12.

Figure 10:
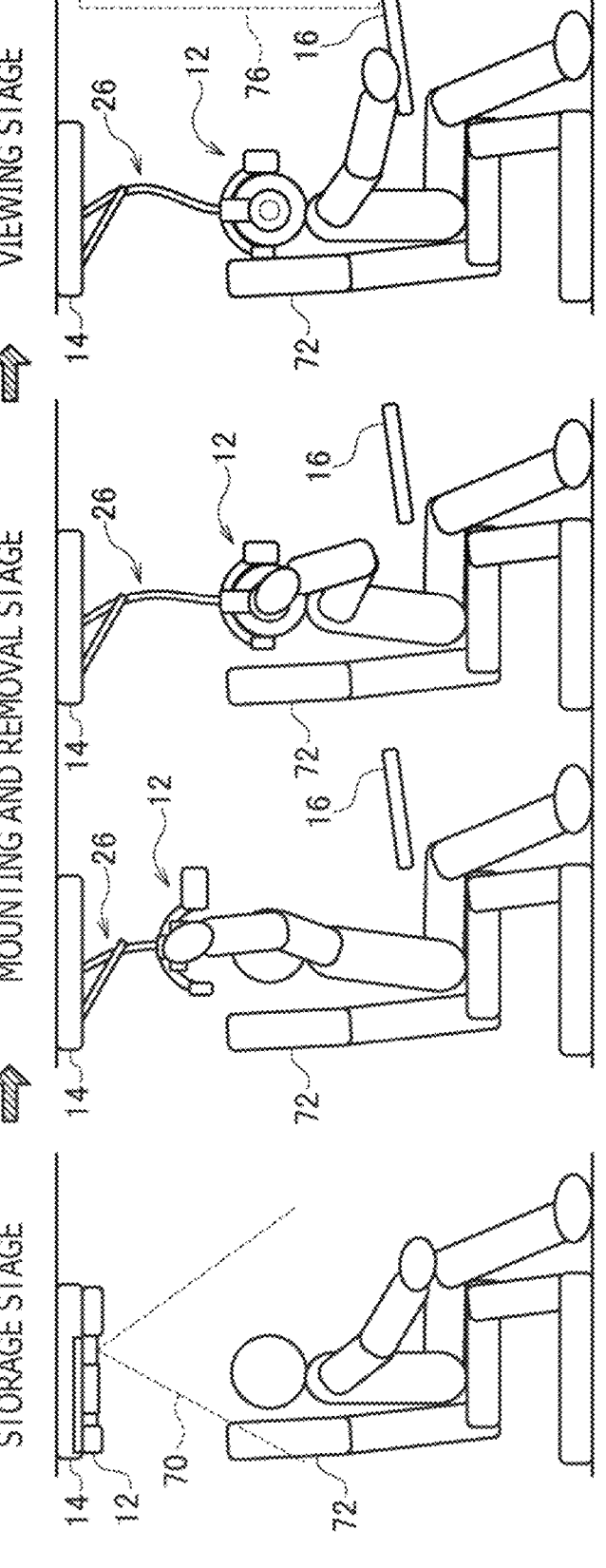
FIG. 10 is a diagram schematically illustrating an operation performed from the time when the HMD is taken out from the storage device to the time when VR content is displayed on the HMD in a VR content display system of a modified example.

FIG. 10 schematically illustrates an operation performed from the time when the HMD 12 is taken out from the storage device 14 to the time when VR content is displayed on the HMD 12 in the VR content display system 10 of the modified example. A user who is going to view VR content inputs a viewing request for the VR content to the input device 16. As in the first embodiment, the VR content display system 10 transitions from the storage stage to the mounting and removal stage (viewing transition stage) in response to reception of the viewing request from the user. The storage control unit 30 of the storage device 14 releases the HMD 12 from the storage device 14 in response to the viewing request transmitted from the input device 16.

Unlike in the first embodiment, on the mounting and removal stage of the modified example, the user grasps the HMD 12 and manually wears the HMD 12 on his/her own head. At this time, the support unit 26 of the storage device 14 maintains the tension on the cable at a constant level, thereby reducing the load on the user.

Meanwhile, as in the first embodiment, the eye-tracking unit 48 of the HMD 12 starts the eye-tracking processing and the processing of determining whether the positions of the pupils of the user are located at the predetermined proper positions or not, in response to the transition to the mounting and removal stage. Further, as in the first embodiment, the display control unit 58 of the HMD 12 starts the display of the VR content on the HMD 12 in response to the determination made by the eye-tracking unit 48 that the positions of the pupils of the user are within the predetermined proper range.

With the VR content display system 10 of this modified example, as in the VR content display system 10 of the first embodiment, the length of time taken from mounting of the HMD 12 on the head of the user to display of VR content on the HMD 12 can be shortened, thereby providing the VR content to the user promptly. Note that, also in the VR content display system 10 of this modified example, the transition mode from the viewing stage to the storage stage is similar to that of the VR content display system 10 of the first embodiment. That is, also in the VR content display system 10 of this modified example, the HMD 12 is automatically removed from the head of the user, and that HMD 12 is automatically stored into the storage device 14.

Another modified example is described. Although not described in the above-mentioned embodiment, the mounting assistance unit 46 of the HMD 12 may stop the automatic mounting sequence of the HMD 12 on the head of the user in a case where a clearance around the head of the user detected by the clearance detection unit 44 is less than a predetermined threshold. In this case, the mounting assistance unit 46 may notify the user of content prompting widening of the clearance around the head. For example, the mounting assistance unit 46 may cause a predetermined display device (for example, the display of the input device 16) to display an image with content prompting widening of the clearance around the head, or may cause the speakers 24 of the HMD 12 to output audio of the same content.

Second Embodiment

Regarding a second embodiment, points different from the first embodiment are mainly described, and the description of points in common is omitted. Features of the second embodiment can include any combination with features of the first embodiment and the modified examples, as a matter of course.

Figure 11:
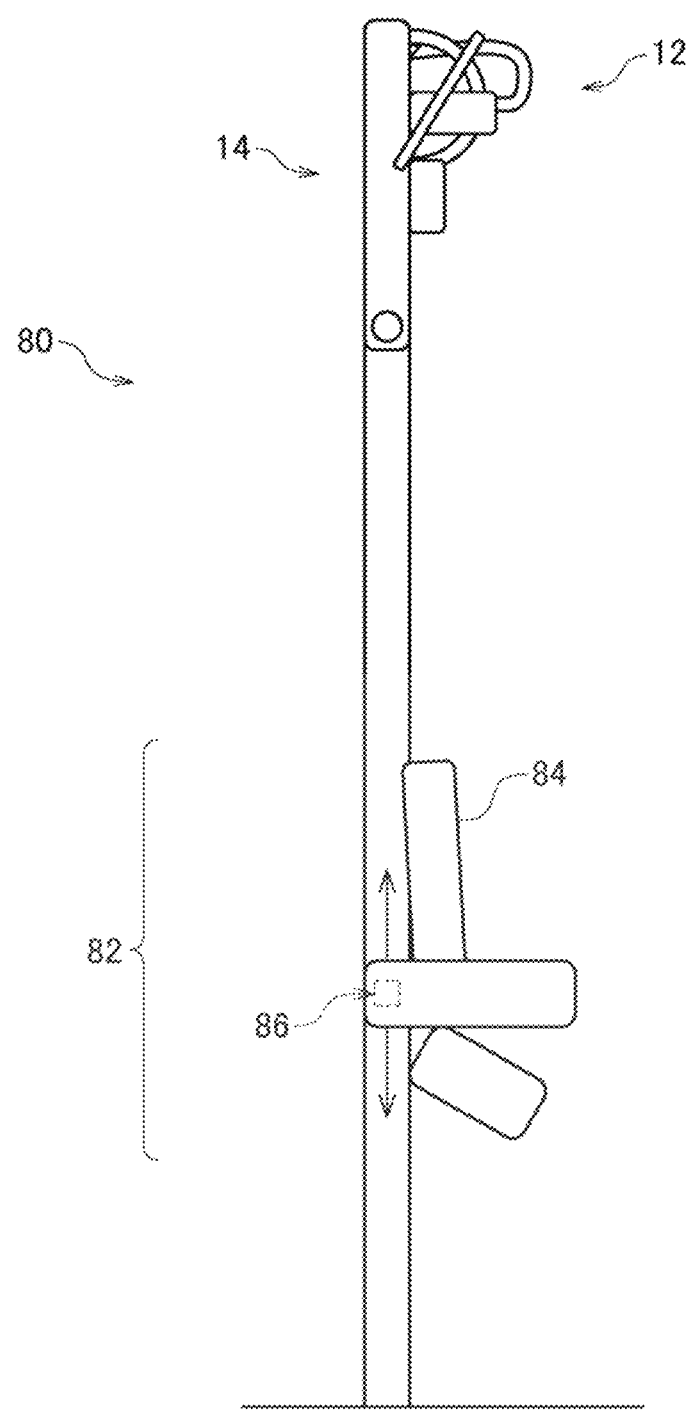
FIG. 11 is a diagram illustrating a configuration of a viewing assistance device of a second embodiment.

FIG. 11 illustrates a configuration of a viewing assistance device 80 of the second embodiment. The viewing assistance device 80 is a device corresponding to the VR content display system 10 of the first embodiment. The viewing assistance device 80 includes the HMD 12, the storage device 14, and an assist unit 82. The configuration of the HMD 12 of the viewing assistance device 80 is similar to the configuration of the HMD 12 of the first embodiment, and the configuration of the storage device 14 of the viewing assistance device 80 is similar to the configuration of the storage device 14 of the first embodiment.

The assist unit 82 includes a seat 84 on which the user sits and a seat holding unit 86. The seat holding unit 86 holds the seat 84 on a housing of the viewing assistance device 80 and assists movement in the up-down direction of the seat 84 along the housing of the viewing assistance device 80. For example, the viewing assistance device 80 may include a spring and reduce load for the seat 84 to move upward by elastic force of the spring.

Figure 12:
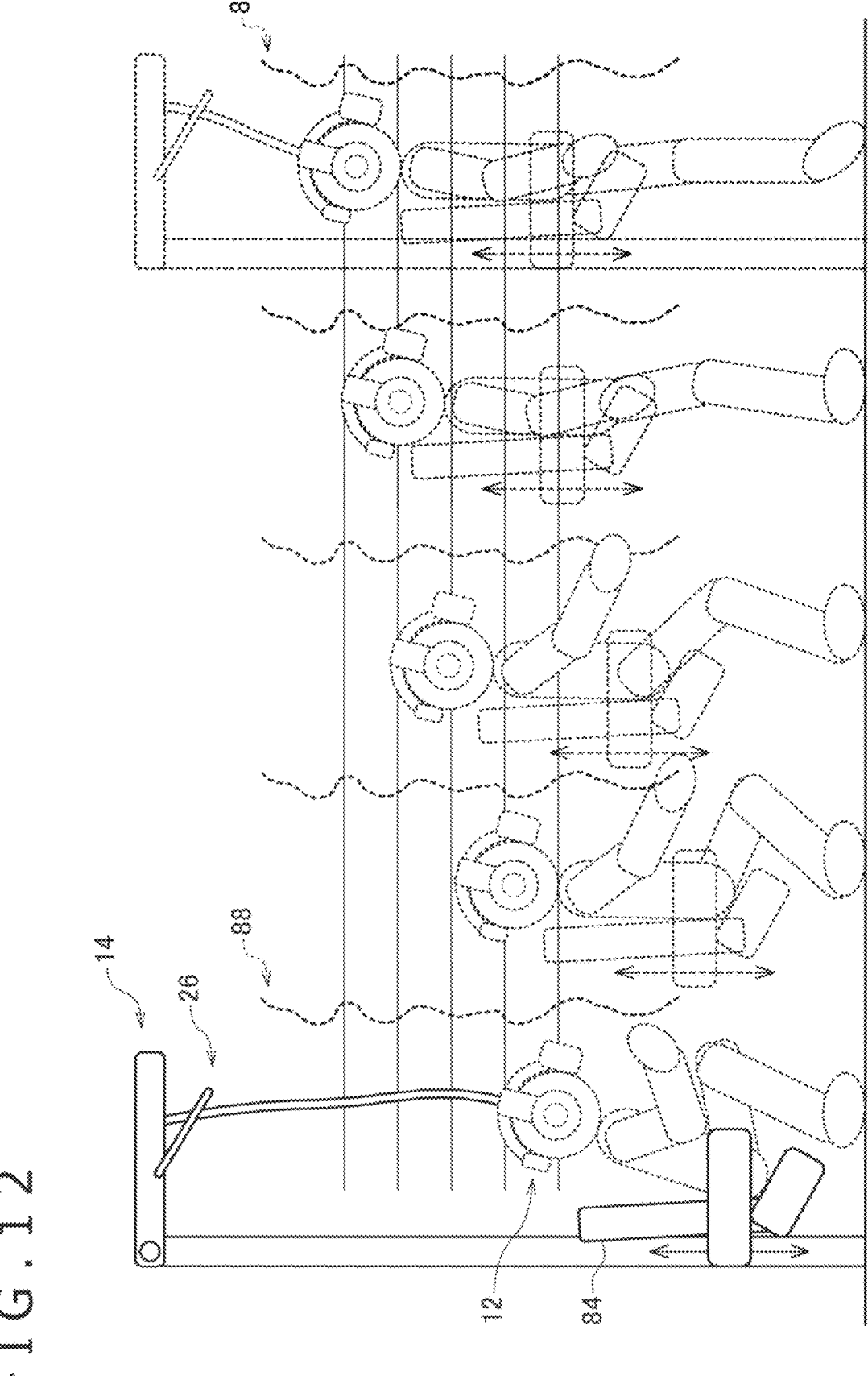
FIG. 12 is a diagram illustrating a usage example of the viewing assistance device.

FIG. 12 illustrates a usage example of the viewing assistance device 80. In FIG. 12, the user bends or stretches his/her legs while viewing VR content 88 displayed on the HMD 12. The motion sensor 134 of the HMD 12 detects the movement in the up-down direction of the HMD 12 that occurs as the user bends or stretches his/her legs. The rendering unit 54 of the HMD 12 changes the viewpoint of the user in the virtual space depending on the movement in the up-down direction of the user in the real space detected by the motion sensor 134 on the viewing stage. The rendering unit 54 generates VR content data on the basis of the viewpoint of the user after the change. That is, the rendering unit 54 changes the display mode of the VR content on the HMD 12 depending on the movement in the up-down direction of the user in the real space.

Figure 13:
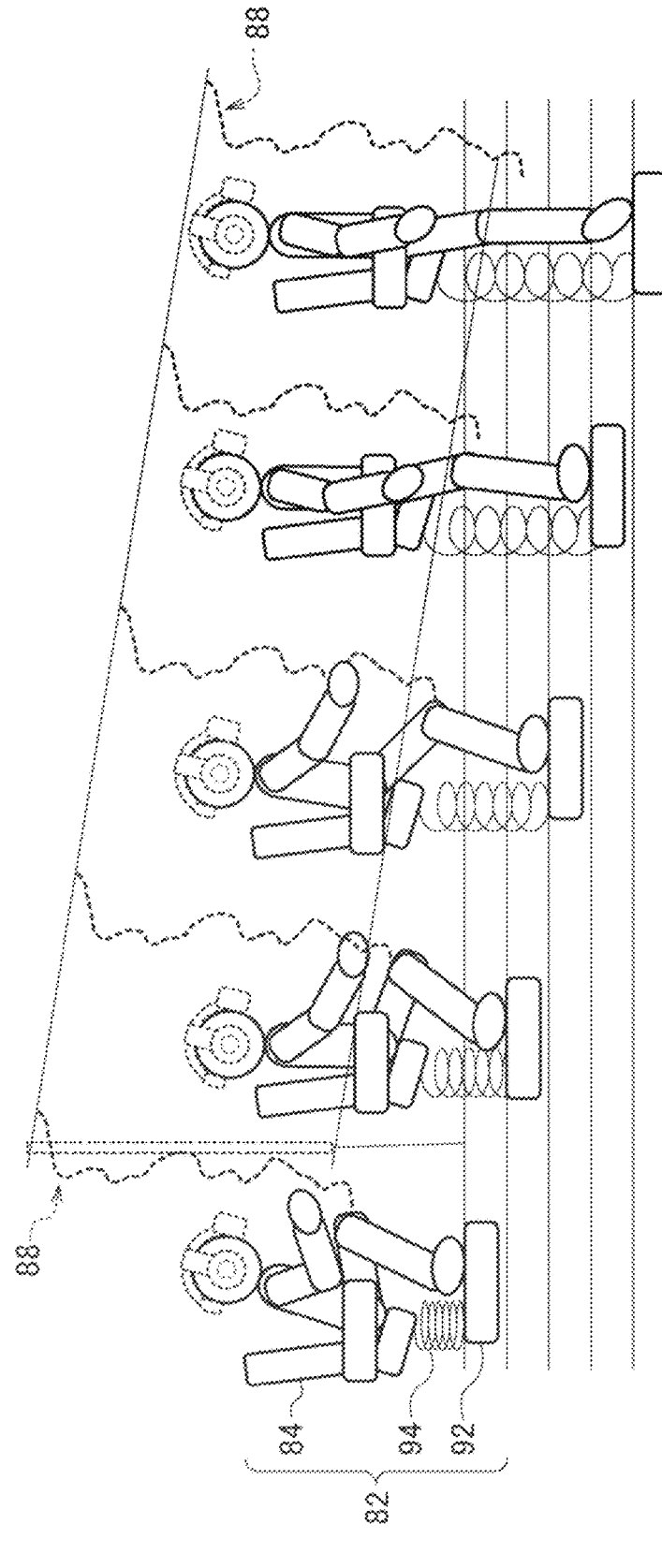
FIG. 13 is a diagram illustrating another configuration of an assist unit of the viewing assistance device.

FIG. 13 illustrates another configuration of the assist unit 82 of the viewing assistance device 80. The assist unit 82 of FIG. 13 includes the seat 84, a footrest 92, and an extendable unit 94. The extendable unit 94 is an extendable member and includes an elastic member such as a spring. With the assist unit 82 of FIG. 13, while the height of the waist of the user does not change, the user can bend and stretch his/her legs while viewing VR content with the footrest 92 configured to move in the up-down direction.

In the example of FIG. 13, the HMD 12 may further include a user motion detection unit configured to detect the movement in the up-down direction of the user. The user motion detection unit may determine that the user has moved downward in a case where the user bends his/her legs and the length of the extendable unit 94 becomes relatively short. On the other hand, the user motion detection unit may determine that the user has moved upward in a case where the user stretches his/her legs and the length of the extendable unit 94 becomes relatively long. The rendering unit 54 of the HMD 12 may change the viewpoint of the user in the virtual space depending on the movement in the up-down direction of the user detected by the user motion detection unit.

In both of the examples of FIG. 12 and FIG. 13, in a case where it is detected that the user has moved downward, the rendering unit 54 recognizes that the viewpoint of the user has been lowered, and generates the VR content 88 as viewed from the viewpoint of the user at a relatively low position. In a case where the user pays close attention to a lower part of the VR content 88, he/she can cause the HMD 12 to display the lower part of the VR content 88 by bending his/her legs.

Further, in both of the examples of FIG. 12 and FIG. 13, in a case where it is detected that the user has moved upward, the rendering unit 54 recognizes that the viewpoint of the user has been raised, and generates the VR content 88 as viewed from the viewpoint of the user at a relatively high position. In a case where the user pays close attention to an upper part of the VR content 88, he/she can cause the HMD 12 to display the upper part of the VR content 88 by bending his/her legs.

With the viewing assistance device 80 of the second embodiment, the viewing of VR content that maintains the physical state of the user can be achieved, thereby improving interest in viewing VR content. In other words, with the viewing assistance device 80 of the second embodiment, it is possible to provide the user with a novel viewing experience in which the user can switch his/her own viewpoint in the VR space by moving his/her body in the up-down direction in a possible range.

Third Embodiment

Regarding a third embodiment, points different from the first embodiment are mainly described, and the description of points in common is omitted. Features of the third embodiment can include any combination with the features of the first embodiment, the second embodiment, and the modified examples, as a matter of course.

FIG. 14 illustrates a configuration and a usage example of the VR content display system 10 of the third embodiment. The VR content display system 10 of the third embodiment includes the HMD 12 and the storage device 14.

Further, as display devices different from the HMD 12, the VR content display system 10 includes a display monitor 100 and a spatial reproduction display 102. The display monitor 100 is a general display configured to display 2D content. The spatial reproduction display 102 is a well-known display configured to detect a line of sight of a viewer and control display of 3D content in real time on the basis of an angle of the line of sight, to thereby reproduce a stereoscopic image that makes it appear as if an object (3D object 104) exists in a space on the display.

The HMD 12 further includes a content acquisition unit (not illustrated). The content acquisition unit acquires data regarding electronic content (2D content or 3D content) displayed on the display monitor 100 and the spatial reproduction display 102, via the communication unit 132. The content acquisition unit may acquire data regarding electronic content displayed on the display monitor 100 and the spatial reproduction display 102, from the display monitor 100 and the spatial reproduction display 102. Alternatively, the content acquisition unit may acquire data regarding electronic content displayed on the display monitor 100 and the spatial reproduction display 102, from a server connected to the display monitor 100 and the spatial reproduction display 102.

The display control unit 58 of the HMD 12 causes the display unit 124 of the HMD 12 to display VR content corresponding to the electronic content acquired by the content acquisition unit. Specifically, the rendering unit 54 of the HMD 12 may generate data regarding VR content including, as objects in the virtual space, the electronic content acquired by the content acquisition unit. Further, the rendering unit 54 may generate data regarding VR content 106 including a virtual display monitor 108 corresponding to the display monitor 100, a virtual spatial reproduction display 110 corresponding to the spatial reproduction display 102, and a 3D object 112 corresponding to the 3D object 104, as illustrated in the viewing stage of FIG. 14. The display control unit 58 may cause the display unit 124 of the HMD 12 to display the VR content generated by the rendering unit 54.

In the VR content display system 10 of the third embodiment, in a case where the user inputs a predetermined operation instructing a VR transition to the input device 16 or the like, the automatic mounting sequence of the HMD 12 similar to that of the first embodiment may be executed. Then, on the viewing stage, the processing of the content acquisition unit, the rendering unit 54, and the display control unit 58 described above may be executed.

With the VR content display system 10 of the third embodiment, objects or information displayed on the display monitor 100 or the spatial reproduction display 102 can be displayed on the HMD 12, in other words, can be displayed as objects in the VR space. The user can check the objects or information displayed on the display monitor 100 or the spatial reproduction display 102, in the VR space with few restrictions provided by the HMD 12, with a wide viewing angle and high resolution. It is thus possible to assist in improving work efficiency of the user.

As a modified example, the storage device 14 may include the content acquisition unit. In this case, the rendering unit 32 of the storage device 14 may generate data regarding VR content including, as objects in the virtual space, electronic content that is acquired by the content acquisition unit and displayed on the display monitor 100 and the spatial reproduction display 102. The display control unit 58 of the HMD 12 may cause the display unit 124 of the HMD 12 to display the VR content generated by the rendering unit 32 of the storage device 14.

The present invention has been described above on the basis of the first embodiment to the third embodiment. It is to be understood by those skilled in the art that these embodiments are illustrative, that various modifications of the combinations of each component or each processing process are possible, and that such modifications are also within the scope of the present invention.

Some of the functions provided by the storage device 14 in the embodiments described above may be provided by the HMD 12. In contrast, some of the functions provided by the HMD 12 in the embodiments described above may be provided by the storage device 14.

Any combinations of the embodiments and modified examples described above are also effective as embodiments of the present invention. New embodiments implemented by the combinations have the effects of each of the embodiments and modified examples combined. Further, it is also to be understood by those skilled in the art that the functions to be exerted by the constituent features described in claims are achieved by each component described in the embodiments and modified examples alone or by the components in cooperation.

The technology described in the embodiments and modified examples described above may be specified by aspects described in the following respective items.

[Item 1]

A virtual reality content display system including: a head-mounted display including a first detection unit configured to detect positions of pupils of a user; a storage unit capable of storing the head-mounted display;

a position determination unit configured to start, in response to the head-mounted display being taken out from the storage unit, determination of whether the positions of the pupils of the user wearing the head-mounted display detected by the first detection unit are located at predetermined proper positions or not; and a display control unit configured to start, in response to determination that the positions of the pupils of the user wearing the head-mounted display are located at the proper positions, display of virtual reality content on the head-mounted display.

With this system, since the HMD can be stored in the storage unit, it is possible to avoid the HMD becoming an obstacle when no VR content is being viewed. Further, VR content can promptly be presented to the user wearing the head-mounted display taken out from the storage unit, thereby shortening a length of waiting time for the user until viewing the VR content.

[Item 2]

The virtual reality content display system according to Item 1, further including:

a second detection unit configured to detect a position of a head of the user; and a mounting assistance unit configured to automatically mount the head-mounted display on the head of the user on the basis of the position of the head of the user detected by the second detection unit.

With this system, the workload on the user to view VR content can be reduced.

[Item 3]

The virtual reality content display system according to Item 2, in which the second detection unit further detects a clearance around the head of the user, and the mounting assistance unit automatically mounts the head-mounted display on the head of the user in a case where the clearance around the head of the user is equal to or greater than a predetermined threshold.

With this system, the HMD is automatically mounted under the condition that there is a sufficient clearance around the head of the user, so that a failure in the automatic mounting of the HMD can be prevented, and the safety thereof can be enhanced.

[Item 4]

The virtual reality content display system according to any one of Items 1 to 3, further including:

a second detection unit configured to detect a position of a head of the user; and a removal assistance unit configured to automatically remove the head-mounted display from the head of the user in a case where the position of the head of the user deviates from a predetermined proper range during the display of the virtual reality content.

With this system, the work of the user at the end of viewing VR content can be reduced.

[Item 5]

The virtual reality content display system according to any one of Items 1 to 4, further including:

a rendering unit configured to generate data regarding the virtual reality content on the basis of a viewpoint of the user in a virtual space; and an assist unit configured to assist movement in an up-down direction of the user in a real space, in which the rendering unit causes the viewpoint of the user in the virtual space to be changed depending on the movement in the up-down direction of the user in the real space.

With this system, the viewing of VR content that maintains the physical state of the user can be achieved, thereby improving the interest in viewing VR content.

[Item 6]

The virtual reality content display system according to any one of Items 1 to 5, further including:

an acquisition unit configured to acquire data regarding electronic content displayed on a display device different from the head-mounted display, in which the display control unit causes the head-mounted display to display virtual reality content corresponding to the electronic content.

With this system, through cooperation between the above-mentioned different display device and the HMD, the work of the user can effectively be supported using VR content, and usage applications of the HMD can be expanded.

[Item 7]

A virtual reality content display method executed by a computer, including:

a step of starting, in response to a head-mounted display being taken out from a storage unit, the head-mounted display including a first detection unit configured to detect positions of pupils of a user, determination of whether the positions of the pupils of the user wearing the head-mounted display detected by the first detection unit are located at predetermined proper positions or not; and

18 a step of starting, in response to determination that the positions of the pupils of the user wearing the head-mounted display are located at the proper positions, display of virtual reality content on the head-mounted display.

With this method, since the HMD can be stored in the storage device, it is possible to avoid the HMD becoming an obstacle when no VR content is being viewed. Further, VR content can promptly be presented to the user wearing the head-mounted display taken out from the storage unit, thereby shortening the length of waiting time for the user until viewing the VR content.

INDUSTRIAL APPLICABILITY

The present invention can be applied to systems and devices configured to display virtual reality content.

REFERENCE SIGNS LIST

10: VR content display system
12: HMD
14: Storage device
32: Rendering unit
42: Head position detection unit
44: Clearance detection unit
46: Mounting assistance unit
48: Eye-tracking unit
54: Rendering unit
58: Display control unit
60: Removal assistance unit
82: Assist unit

The invention claimed is:

1. A virtual reality content display system comprising:

a head-mounted display including a first sensor to detect positions of pupils of a user;

a storage device capable of storing the head-mounted display; and processing circuitry configured to in response to the head-mounted display being taken out from the storage device, determine whether the positions of the pupils of the user wearing the head-mounted display detected by the first sensor are located at predetermined proper positions or not;

in response to a determination that the positions of the pupils of the user wearing the head-mounted display are located at the proper positions, display of virtual reality content on the head-mounted display;

generate data regarding the virtual reality content on a basis of a viewpoint of the user in a virtual space;

assist movement in an up-down direction of the user in a real space; and change the viewpoint of the user in the virtual space based on the movement in the up-down direction of the user in the real space.

2. The virtual reality content display system according to claim 1, further comprising:

a second sensor to detect a position of a head of the user, wherein the processing circuitry is further configured to automatically mount the head-mounted display on the head of the user on a basis of the position of the head of the user detected by the second sensor.

3. The virtual reality content display system according to claim 2, wherein the second sensor further detects a clearance around the head of the user, wherein the processing circuitry is further configured to automatically mount the head-mounted display on the head of the user in a case where the clearance around the head of the user is equal to or greater than a predetermined threshold.

4. The virtual reality content display system according to claim 1, further comprising:

a second sensor configured to detect a position of a head of the user, wherein the processing circuitry is further configured to automatically remove the head-mounted display from the head of the user in a case where the position of the head of the user deviates from a predetermined proper range during the display of the virtual reality content.

5. The virtual reality content display system according to claim 1, wherein the processing circuitry is further configured to acquire data regarding electronic content displayed on a display different from the head-mounted display, cause the head-mounted display to display virtual reality content corresponding to the electronic content.

6. The virtual reality content display system according to claim 1, wherein the storage device includes a support system configured to connect the storage device to the head-mounted display, the support comprising:

a cable to hold the head-mounted display and transmit force for restricting movement of the user; and a motor configured to control tension on the cable to be constant.

7. The virtual reality content display system according to claim 1, wherein the head-mounted display further includes:

a left-eye display panel and a right-eye display panel;

a left lens positioned between the left-eye display panel and a left eye of the user; and a right lens positioned between the right-eye display panel and a right eye of the user, wherein the proper positions include positions where the left pupil directly faces the left lens and the right pupil directly faces the right lens.

8. The virtual reality content display system according to claim 1, wherein the processing circuitry is further configured to:

execute optical correction during a period until determining that the positions of the pupils are located at the predetermined proper positions, the optical correction including at least one of viewpoint position adjustment, interpupillary distance adjustment, and diopter adjustment.

9. The virtual reality content display system according to claim 1, wherein the processing circuitry is further configured to:

automatically remove the head-mounted display from the head of the user in response to detecting a predetermined voice command.

10. The virtual reality content display system according to claim 1, wherein the head-mounted display includes:

a mounting portion to cover the head of the user in a left-right direction; and another mounting portion to cover the head of the user in a front-back direction.

11. The virtual reality content display system according to claim 1, wherein the processing circuitry is further configured to:

detect that the head-mounted display has entered a standby state where the head-mounted display is suspended above the user;

wait for input of either a storage instruction operation or a re-mounting instruction operation while in the standby state; and automatically store the head-mounted display into the storage device in response to receiving the storage instruction operation.

12. The virtual reality content display system according to claim 1, wherein the head-mounted display includes a camera configured to image a space around the head-mounted display, and the processing circuitry is further configured to:

automatically store the head-mounted display into the storage device in response to detecting an object approaching the head-mounted display while in a standby state.

13. The virtual reality content display system according to claim 1, wherein the processing circuitry is further configured to:

generate virtual reality images by the storage device;

transmit the virtual reality images to the head-mounted display; and execute reprojection processing by the head-mounted display in response to detected movement of the head-mounted display.

14. The virtual reality content display system according to claim 1, wherein the processing circuitry is further configured to:

generate distant view virtual reality images by the storage device;

generate near view virtual reality images by the head-mounted display; and combine the distant view virtual reality images and near view virtual reality images to create composite images for display.

15. The virtual reality content display system according to claim 1, wherein the processing circuitry is further configured to:

execute line-of-sight-dependent rendering correction in response to determining that the positions of the pupils are at the proper positions, the rendering correction including rendering position correction and foveal precision correction.

16. The virtual reality content display system according to claim 1, further comprising:

a marker band configured to be worn on the head of the user, the marker band including a marker; and a marker sensor provided in the head-mounted display configured to detect a position of the marker, wherein the processing circuitry determines a mounting position of the head-mounted display based on the detected position of the marker.

17. The virtual reality content display system according to claim 1, wherein the storage device includes a storage hook configured to support and fix the head-mounted display in a stored state, and the processing circuitry is further configured to release the storage hook to release the head-mounted display from the storage device in response to receiving a viewing request.

18. A virtual reality content display method executed by a computer, comprising:

in response to a head-mounted display being taken out from a storage unit, the head-mounted display including a first sensor to detect positions of pupils of a user, determining whether the positions of the pupils of the user wearing the head-mounted display detected by the first sensor are located at predetermined proper positions or not;

starting, in response to a determination that the positions of the pupils of the user wearing the head-mounted display are located at the proper positions, display of virtual reality content on the head-mounted display;

generating data regarding the virtual reality content on a basis of a viewpoint of the user in a virtual space;

assisting movement in an up-down direction of the user in a real space; and changing the viewpoint of the user in the virtual space based on the movement in the up-down direction of the user in the real space.

* * * * *